US012802504B2

(12) United States Patent
Von Holst et al.

(10) Patent No.: US 12,802,504 B2
(45) Date of Patent: Nov. 17, 2026

(54) METHOD FOR OUTPUTTING STEERING STATE INFORMATION

(71) Applicant: Deere & Company, Moline, IL (US)

(72) Inventors: Christian Von Holst, Hettenleidelheim (DE); Florian Schott, Einhausen (DE); Marc Schaefer, Mainz (DE); Michael Hillebrand, Paderborn (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/023,728

(22) Filed: Jan. 16, 2025

(65) Prior Publication Data

US 2025/0259489 A1 Aug. 14, 2025

(30) Foreign Application Priority Data

Feb. 8, 2024 (EP) .................................... 24156571

(51) Int. Cl.
*G07C 5/08* (2006.01)
*A01B 76/00* (2006.01)

(52) U.S. Cl.
CPC ............ *G07C 5/0825* (2013.01); *A01B 76/00* (2013.01); *G07C 5/0808* (2013.01)

(58) Field of Classification Search
CPC .... G07C 5/0825; G07C 5/0808; A01B 76/00; B60C 23/0408; B60W 2300/15;
(Continued)

(56) References Cited

U.S. PATENT DOCUMENTS 10,524,403 B2 1/2020 Gresch et al.
2005/0087378 A1* 4/2005 Hrazdera ................ F16H 61/66 180/170
(Continued)

FOREIGN PATENT DOCUMENTS

DE 19804249 A1 8/1999
DE 102016218859 A1 3/2018
(Continued)

OTHER PUBLICATIONS

European Search Report issued in Application No. 24156571.2, dated Aug. 2, 2024, 13 pages.

*Primary Examiner* — Anne Marie Antonucci
*Assistant Examiner* — Jewel A Kuntz
(74) *Attorney, Agent, or Firm* — Shook, Hardy & Bacon L.L.P.

(57) ABSTRACT

A method for outputting steering state information to a driver of an agricultural tractor includes transmitting via a data interface information including a fitted tire, a tire inflation pressure, an axle load, and a speed to a control unit, checking via the control unit whether as a first triggering condition, the speed exceeds a limit value provided for emergency steering operation, the limit value being given according to the fitted tire, the tire inflation pressure, and the axle load, and as a second triggering condition, the tire inflation pressure is below a limit value provided for the emergency steering operation, the limit value being specified according to the fitted tire, the speed, and the axle load, and activating a user interface via the control unit to output steering state information indicating a critical steering state when at least one of the first and second triggering conditions is met.

8 Claims, 2 Drawing Sheets

(58) Field of Classification Search
CPC ........... B60W 2300/152; B60W 50/02; B60W 2520/10; B60W 2530/10; B60W 2530/20; B60W 50/14; B62D 5/32; B60Y 2200/22
See application file for complete search history.

(56) References Cited

U.S. PATENT DOCUMENTS

| | | | | |
|---|---|---|---|---|
| 2019/0219489 | A1* | 7/2019 | Ki | G01N 33/24 |
| 2022/0192075 | A1* | 6/2022 | Kurata | A01B 69/006 |

FOREIGN PATENT DOCUMENTS

| | | | |
|---|---|---|---|
| DE | 102017205827 | A1 | 10/2018 |
| DE | 102021129151 | A1 | 5/2023 |
| EP | 2843378 | A1 | 3/2015 |
| EP | 3315926 | A1 | 5/2018 |
| EP | 3523179 | B1 | 12/2021 |
| EP | 3797059 | B1 | 8/2023 |

* cited by examiner

METHOD FOR OUTPUTTING STEERING STATE INFORMATION

CROSS-REFERENCE TO RELATED APPLICATIONS

This application claims priority to European Patent Application No. 24156571.2, filed Feb. 8, 2024, which is hereby incorporated by reference.

FIELD OF THE DISCLOSURE

The disclosure relates to a method for outputting steering state information to a driver of an agricultural tractor.

BACKGROUND

For gentle field cultivation, modern agricultural tractors increasingly have devices for adjusting the tire inflation pressure.

SUMMARY

This is effected in such a manner that, before driving on a field surface to be cultivated, the tire inflation pressure is lowered in the sense of a purposive increase in the tire shuffle and thus in the tire contact patch, in order to reduce the surface pressure exerted on account of the tractor weight so as to avoid excessive compaction of the soil. However, at the steerable axle of the agricultural tractor, an increase in the tire shuffle at the same time results in an increase in the steering resistance. This also applies correspondingly to the actuating torque which is to be applied by a steering system provided for moving the steerable wheels. In the case where the steering assistance provided by the steering system is impaired, this actuating torque has to be applied manually by the driver via the steering control element in an emergency steering operation. Steering of the agricultural tractor is more difficult in this case and, especially at higher traveling speeds, as are typical, for example, for road travel, leads to an undesirable or excessive increase in the turning circle diameter. Such a critical steering state can be surprising, or difficult to judge, for the driver.

Accordingly, the object of the present disclosure is to provide a method of the type mentioned at the beginning, such that the driver is assisted in recognizing a critical steering state of the agricultural tractor in good time.

This object is achieved by a method for outputting steering state information to a driver of an agricultural tractor having the features of one or more embodiments disclosed herein.

In a method for outputting steering state information to a driver of an agricultural tractor, it is provided that information, provided via a data interface, regarding a fitted tire model or type, a tire inflation pressure, an axle load on a front and/or rear axle of the agricultural tractor and a current traveling speed of the agricultural tractor is transmitted to a control unit (e.g., a controller including a processor and memory) in order to check, on the basis of that information, whether either (i) as a first triggering condition, the current traveling speed exceeds a limit value provided for an emergency steering operation, the limit value being specified according to the fitted tire model or type, the tire inflation pressure and the axle load, or (ii) as a second triggering condition, the tire inflation pressure is below a limit value provided for the emergency steering operation, the limit value being specified according to the fitted tire model or type, the traveling speed and the axle load, wherein, in the event that one of the two triggering conditions is met, the outputting of driver information indicating a critical steering state is effected by the control unit by activation of a user interface.

The method takes account of situations in which, as a result of increased tire shuffle at the steerable wheels of the agricultural tractor, steering of the agricultural tractor may be more difficult and, depending on the traveling speed of the agricultural tractor, an undesirable or excessive increase in the turning circle diameter may occur in the case of an emergency steering operation. An emergency steering operation is present if the steering assistance provided by the steering system of the agricultural tractor is impaired. On the basis of the outputted driver information, the driver has the opportunity either to adapt his driving behavior in advance by reducing the traveling speed or to increase the tire inflation pressure in good time, for example by means of a tire inflation system. Depending on whether the first or second triggering condition is met, correspondingly adapted driver information can be outputted via the user interface, so that the driver receives a clear indication of the nature of the countermeasures which are to be taken in each case.

The steering system is generally a hydrostatic vehicle steering mechanism conventional in agricultural tractors, having a steering orbitrol, which is supplied with hydraulic fluid from a high-pressure pump and which can be set in rotation by the driver via the steering control element, which is in the form of a steering wheel, in order to deflect a steering cylinder, which is in communication with the steering orbitrol. The steering cylinder is in turn connected to an axle-pivot steering mechanism for moving the steerable wheels of the agricultural tractor. In the event of failure or faulty operation of the hydraulic supply, the steering orbitrol takes on the function of the high-pressure pump in that a hydraulic volume flow leading to deflection of the steering cylinder can be generated by rotation of the steering control element and thus of the steering orbitrol. Under such circumstances, although steering of the agricultural tractor continues to be possible, it requires the application of a correspondingly large amount of force on the part of the driver.

The limit values are therefore specified such that it is ensured under all circumstances that the driver is able to steer the agricultural tractor via the steering control element with a given actuating torque within a given period of time at a given traveling speed, while maintaining a given turning circle diameter, even if steering assistance on the part of the steering system fails completely owing to a malfunction. The corresponding specifications are set down in standard ISO10998.

In addition to the tire inflation pressure, the tire model fitted to the steerable wheels, or the fitted tire type, and the axle load acting on the tires are also important for the extent of the tire shuffle. The axle load is in turn dependent on the ballasting of the agricultural tractor and also on any additional equipment or attachments mounted thereon. The steerable wheels are typically associated with the front axle of the agricultural tractor, but in addition or alternatively they can also be provided on the rear axle. An articulated-frame steering mechanism as is used in some agricultural tractors is additionally conceivable.

The information regarding the fitted tire model or type that is provided via the data interface, for example via a CAN databus present in the agricultural tractor, can be based either on details which the driver inputs, under the guidance of a menu, via the user interface in communication with the control unit, or on tire data provided by the manufacturer, which are acquired by wireless reading of an RFID tag embedded in the tire bead by means of an RFID reader connected to the control unit.

Pressure sensors can further be used to determine the tire inflation pressure, the sensors likewise being embedded in the tire bead and transmitting the associated pressure information via a wireless communication link to a tire inflation system and from there, via the CAN databus, to the control unit.

With regard to the provision of the information regarding the axle load, there are several possibilities. For example, this information can be based on a direct acquisition of the axle load by means of sensors, for example by evaluation of the pressure conditions of a hydraulic wheel suspension or of the tire inflation pressure in conjunction with the extent of an observed tire deformation. However, an evaluation of the current ballasting of the agricultural tractor can also be carried out. The ballasting is derived for example from the presence of removable (wheel) ballast weights, additional equipment or attachments and a (variable) payload. There may be mentioned here by way of example a front loader for picking up load or bulk material, but also working equipment carried on a three-point power lift of the agricultural tractor, for example a fertilizer spreader for applying fertilizer granules located in a storage container. It is conceivable here to use weighing devices, as are described in EP 2 843 378 A1, DE 10 2016 218 859 A1, or EP 3 315 926 A1 (U.S. Pat. No. 10,524,403 B2). In the case of removable (wheel) ballast weights of known mass, information can also be provided directly by the driver via the user interface, which provides a corresponding menu-guided input for this purpose.

The information regarding the current traveling speed of the agricultural tractor is also available in the form of wheel speed signals at the CAN databus.

The user interface in communication with the control unit is configured to output acoustic, visual and/or haptic messages, for example in the form of beeps, text messages, vibrations sent to the steering control element and the like.

Advantageous developments of the method according to the disclosure can be found in one or more embodiments disclosed herein.

In order to avoid the outputting of unnecessary and thus possibly distracting driver information, the user interface is activated when, or activated only when, an imminent or already existing functional limitation of the steering mechanism or steering system is recognized by the control unit, for example on the basis of a hydraulic pressure drop, characteristic thereof, in the hydraulic supply of the steering orbitrol.

It is further conceivable that, when the first triggering condition is met, the control unit, in addition to outputting the driver information, automatically limits or reduces the traveling speed of the agricultural tractor to a specified maximum value by intervention in a drive management system. The maximum value is typically specified in the order of from 10 to 20 km/h.

It is accordingly possible that, when the second triggering condition is met, the control unit, in addition to outputting the driver information, at the same time automatically increases the tire inflation pressure by activation of the tire inflation system. The pressure is for example increased to a value provided for road travel.

In both cases, the driver is actively assisted in avoiding critical steering states.

In order to rule out an intervention in the drive management system or the tire inflation system that is unexpected for the driver, it can additionally be provided that the limitation or reduction of the traveling speed or the increase of the tire inflation pressure takes place after, or takes place only after, it has previously been approved by the driver, for example via the user interface.

The above and other features will become apparent from the following detailed description and accompanying drawings.

BRIEF DESCRIPTION OF THE DRAWINGS

The method according to the disclosure will be explained in more detail hereinafter on the basis of the appended drawings, in which.

DETAILED DESCRIPTION

The embodiments or implementations disclosed in the above drawings and the following detailed description are not intended to be exhaustive or to limit the present disclosure to these embodiments or implementations.

Figure 1:
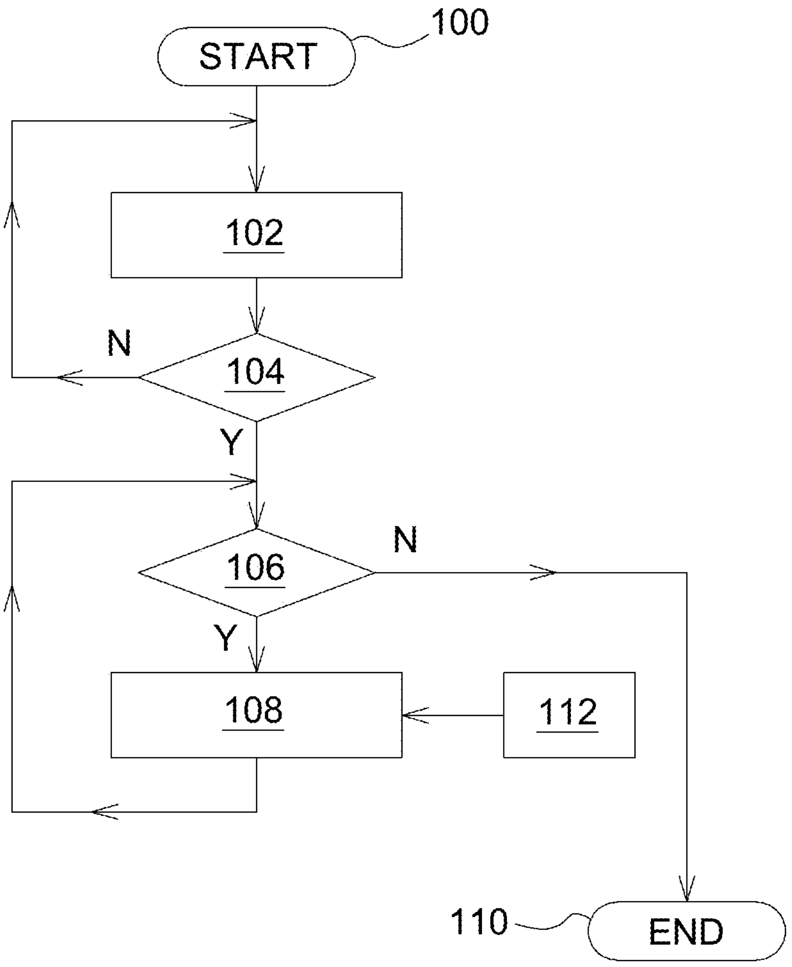
FIG. 1 shows an example embodiment of the method according to the disclosure for outputting steering state information to a driver of an agricultural tractor.

FIG. 1 shows an example embodiment in the form of a flow diagram of the method according to the disclosure for outputting steering state information to a driver of an agricultural tractor.

For better understanding, the arrangement 10 shown schematically in FIG. 2, which serves for carrying out the method according to FIG. 1 and is part of the agricultural tractor 12, will first be discussed.

Figure 2:
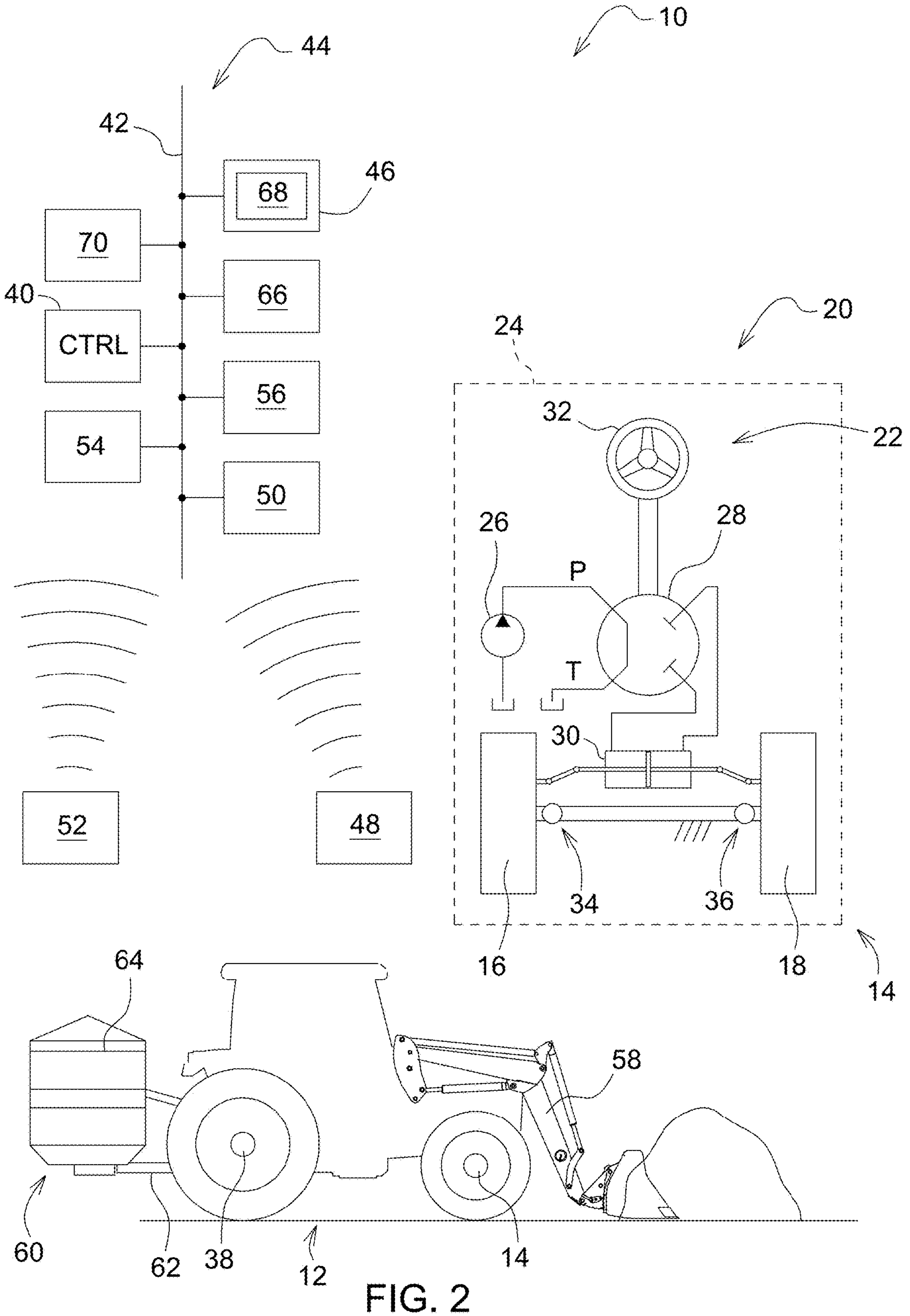
FIG. 2 shows an example of an arrangement in an agricultural tractor for carrying out the method illustrated in FIG. 1.

According to the example, the agricultural tractor 12 shown in FIG. 2 has steerable wheels 16, 18 associated with a front axle 14, which can be moved in respect of their wheel steering angle by means of a steering system 20 via a steering control element 22, which can be actuated by the driver. The steering system 20 is a hydrostatic vehicle steering mechanism 24 having a steering orbitrol 28, which is supplied with hydraulic fluid from a high-pressure pump 26 and which can be set in rotation by the driver via the steering control element 22, which is in the form of a steering wheel 32, in order to deflect a steering cylinder 30, which is in communication with the steering orbitrol 28. The steering cylinder 30 is in turn connected to an axle-pivot steering mechanism 32, 34 for moving the steerable wheels 16, 18 of the agricultural tractor 12. In the event of failure or faulty operation of the hydraulic supply, the steering orbitrol 28 takes on the function of the high-pressure pump 26 in that a hydraulic volume flow leading to deflection of the steering cylinder 30 can be generated by rotation of the steering control element 22 and thus of the steering orbitrol 28. Under such circumstances, although steering of the agricultural tractor 12 continues to be possible, it requires the application of a correspondingly large amount of force on the part of the driver.

Although the steerable wheels 16, 18 are in the present case associated with the front axle 14 of the agricultural tractor 12, they can additionally or alternatively, depending on the design of the agricultural tractor 12, also be provided on the rear axle 38. An articulated-frame steering mechanism as is used in some agricultural tractors is additionally conceivable.

As can further be seen in FIG. 2, the arrangement 10 provided in the agricultural tractor 12 comprises a microprocessor-controlled control unit 40, to which there is transmitted via a data interface 44 in the form of a CAN databus 42 information regarding a tire model or type fitted to the agricultural tractor 12, a tire inflation pressure, an axle load and the current traveling speed of the agricultural tractor 12. It is here sufficient for the mentioned information to be limited in each case to the axle equipped with the steerable wheels 16, 18, that is to say here to the front axle 14 of the agricultural tractor 12.

The information regarding the fitted tire model or type that is provided via the CAN databus 42 is based either on details which the driver inputs, under the guidance of a menu, via a user interface 46 in communication with the control unit 40, or on tire data provided by the manufacturer, which are acquired by wireless reading of an RFID tag 48 embedded in the tire bead by means of an RFID reader 50 connected to the control unit 40 via the CAN databus 42.

Pressure sensors 52 are further used to determine the tire inflation pressure, the sensors likewise being embedded in the tire bead and transmitting the associated pressure information via a wireless communication link to a tire inflation system 54 and from there, via the CAN databus 42, to the control unit 40.

With regard to the provision of the information regarding the axle load, there are several possibilities, which are represented notionally in FIG. 2 by an axle load determination device 56. For example, the information in question is based either on a direct acquisition of the axle load by means of sensors, for example by evaluation of the pressure conditions of a hydraulic wheel suspension or of the tire inflation pressure in conjunction with the extent of an observed tire deformation. However, an evaluation of the current ballasting of the agricultural tractor 12 can also be carried out. This is given for example by the presence of removable (wheel) ballast weights, attachments or accessory equipment and a (variable) payload. According to the representation in FIG. 2, there is a front loader 58 for picking up load or bulk material and working equipment 60, carried on a three-point power lift 62 of the agricultural tractor 12, in the form of a fertilizer spreader 64 for applying fertilizer granules located in a storage container. It is conceivable here to use weighing devices, as are described in EP 2 843 378 A1, DE 10 2016 218 859 A1, or EP 3 315 926 A1 (U.S. Pat. No. 10,524,403 B2), which are incorporated by reference. In the case of removable (wheel) ballast weights of known mass, information is, however, provided directly by the driver via the user interface 46, which provides a corresponding menu-guided input for this purpose.

The information regarding the current traveling speed of the agricultural tractor 12 is also available in the form of wheel speed signals at the CAN databus 42. A drive management system 66 allows the traveling speed to be purposively influenced by the control unit 40.

The user interface 46 in communication with the control unit 40 not only provides the possibility of inputs by the driver via a touch-sensitive control panel 68 included in the user interface, but is also configured to output acoustic, visual and/or haptic messages, for example in the form of beeps, text messages, vibrations sent to the steering control element 22 and the like.

The method performed by the control unit 40 and stored in the form of corresponding program code in an associated memory unit 70 is initiated according to FIG. 1 in a start step 100. In this step, in a first main step 102, the information, provided via the CAN databus 42, regarding the fitted tire model or type, the tire inflation pressure, the axle load and the current traveling speed of the agricultural tractor 12 is first read out and stored temporarily in the memory unit 70.

In a subsequent second main step 104, the control unit 40 checks whether an imminent or already existing functional limitation of the steering mechanism or steering system 20 and thus an emergency steering operation is present. An emergency steering operation is present if the steering assistance provided by the steering system 20 of the agricultural tractor 12 is impaired. If that is the case, the method continues with a third main step 106. Otherwise, the method returns to the first main step.

On the basis of the information read in the first main step 102, the control unit 40 checks in the third main step 106 whether either (i) as a first triggering condition, the current traveling speed exceeds a limit value provided for the emergency steering operation, the limit value being specified according to the fitted tire model or type, the tire inflation pressure and the axle load, or (ii) as a second triggering condition, the tire inflation pressure is below a limit value provided for the emergency steering operation, the limit value being specified according to the fitted tire model or type, the traveling speed and the axle load.

If one of the two above-mentioned triggering conditions is met, then the method continues with a fourth main step 108, in which the control unit 40 effects the outputting of driver information indicating a critical steering state by activation of the user interface 46. Depending on whether the first or second triggering condition is met, the outputting of the driver information is adapted by the control unit 40, by correspondingly choosing the acoustic, visual and/or haptic messages which can be generated by means of the user interface 46, such that the driver receives a clear indication of the nature of the countermeasures which are to be taken. The driver thus has the opportunity either to adapt his driving behavior in advance by reducing the traveling speed or to increase the tire inflation pressure in good time by means of the tire inflation system 54.

The second main step 104 serves to avoid the outputting of unnecessary and thus possibly distracting driver information in that the user interface 46 is activated when, or activated only when, an imminent or already existing functional limitation of the steering mechanism or steering system 20 is recognized by the control unit 40, for example on the basis of a hydraulic pressure drop, characteristic thereof, in the hydraulic supply of the steering orbitrol 28.

Regardless of which triggering condition is met, the corresponding driver information is outputted in each case until it is recognized by the control unit 40 in the fourth main step 108 that the traveling speed or the tire inflation pressure no longer exceeds or is no longer below the limit value. The method is then ended in an end step 110 in order to start again with the start step 100.

The limit values used in the fourth main step 108 are specified such that it is ensured under all circumstances that the driver is able to steer the agricultural tractor 12 via the steering control element 22 with a given actuating torque within a given period of time at a given traveling speed, while maintaining a given turning circle diameter, even if steering assistance on the part of the steering system 20 fails completely owing to a malfunction. The corresponding specifications are set down in standard ISO10998.

Optionally, in the fourth main step 108, when the first triggering condition is met, the control unit 40, in addition to outputting the driver information, automatically limits or reduces the traveling speed of the agricultural tractor 12 to a specified maximum value by intervention in a drive management system 66 (see FIG. 2). The maximum value is specified in the order of from 10 to 20 km/h.

Analogously, when the second triggering condition is met, the control unit 40, in addition to outputting the driver information, at the same time automatically increases the tire inflation pressure by activation of the tire inflation system 54. The pressure is increased to a value provided for road travel.

In both cases, the driver is actively assisted in avoiding critical steering states.

In order to rule out an intervention in the tire inflation system 54 or the drive management system 66 that is unexpected for the driver, it is additionally provided in a subsidiary step 112 that the limitation or reduction of the traveling speed or the increase of the tire inflation pressure takes place after, or takes place only after, it has previously been approved by the driver via the user interface 46.

As a result, the method according to the disclosure takes account of situations in which, as a result of increased tire shuffle at the steerable wheels 16, 18 of the agricultural tractor 12, steering of the agricultural tractor 12 may be more difficult and, depending on the traveling speed of the agricultural tractor 12, an undesirable or excessive increase in the turning circle diameter may occur in the case of an emergency steering operation. This is because, in addition to the tire inflation pressure, the tire model fitted to the steerable wheels 16, 18, or the fitted tire type, and the axle load acting on the tires are also important for the extent of the tire shuffle. The axle load is in turn dependent on the ballasting of the agricultural tractor 12 and also on any additional equipment or attachments mounted thereon.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for outputting steering state information to a driver of an agricultural tractor, comprising:

transmitting via a data interface information including a fitted tire model or type, a tire inflation pressure, an axle load on a front and rear axle of the agricultural tractor, and a current traveling speed of the agricultural tractor to a control unit;

checking via the control unit on the basis of the information whether (i) as a first triggering condition, the current traveling speed exceeds a limit value provided for emergency steering operation, the limit value being given according to the fitted tire model or type, the tire inflation pressure and the axle load, and (ii) as a second triggering condition, the tire inflation pressure is below a limit value provided for the emergency steering operation, the limit value being specified according to the fitted tire model or type, the current traveling speed and the axle load; and activating a user interface via the control unit to output steering state information indicating a critical steering state when at least one of the first and second triggering conditions is met, wherein, when the current traveling speed exceeds a limit value provided for emergency steering operation, the control unit, in addition to outputting the steering state information, automatically limits or reduces the current traveling speed of the agricultural tractor to a predetermined maximum value by controlling a drive management system via the data interface, and when the tire inflation pressure is below a limit value provided for the emergency steering operation, the control unit, in addition to outputting the steering state information, at the same time, automatically increases the tire inflation pressure by activating a tire inflation system.

2. The method of claim 1, wherein the control unit activates the user interface when an imminent or already existing functional limitation of a steering mechanism is recognized by the control unit.

3. The method of claim 1, wherein the limitation or reduction of the current traveling speed occurs after it has previously been approved by the driver.

4. The method of claim 1, wherein the increase of the tire inflation pressure occurs after it has previously been approved by the driver.

5. A system for outputting steering state information to a driver of an agricultural tractor, comprising:

a control unit configured to receive information from a data interface, the information including a fitted tire model or type, a tire inflation pressure, an axle load on a front and rear axle of the agricultural tractor, and a current traveling speed of the agricultural tractor, the control unit configured to check whether (i) as a first triggering condition, the current traveling speed exceeds a limit value provided for emergency steering operation, the limit value being given according to the fitted tire model or type, the tire inflation pressure, and the axle load, and (ii) as a second triggering condition, the tire inflation pressure is below a limit value provided for the emergency steering operation, the limit value being specified according to the fitted tire model or type, the current traveling speed, and the axle load, and the control unit configured to activate a user interface outputting steering state information indicating a critical steering state when at least one of the first and second triggering conditions is met, wherein, when the current traveling speed exceeds a limit value provided for emergency steering operation, the control unit, in addition to outputting the steering state information, automatically limits or reduces the current traveling speed of the agricultural tractor to a predetermined maximum value by controlling a drive management system via the data interface, and when the tire inflation pressure is below a limit value provided for the emergency steering operation, the control unit, in addition to outputting the steering state information, at the same time automatically increases the tire inflation pressure by activating a tire inflation system.

6. The system of claim 5, wherein the control unit activates the user interface when an imminent or already existing functional limitation of a steering mechanism is recognized by the control unit.

7. The system of claim 5, wherein the limitation or reduction of the current traveling speed occurs after it has previously been approved by the driver.

8. The system of claim 5, wherein the increase of the tire inflation pressure occurs after it has previously been approved by the driver.

* * * * *